Feb. 23, 1932.   C. A. PIPPIN   1,846,437
PIPE SWAGING TOOL
Filed Nov. 28, 1930
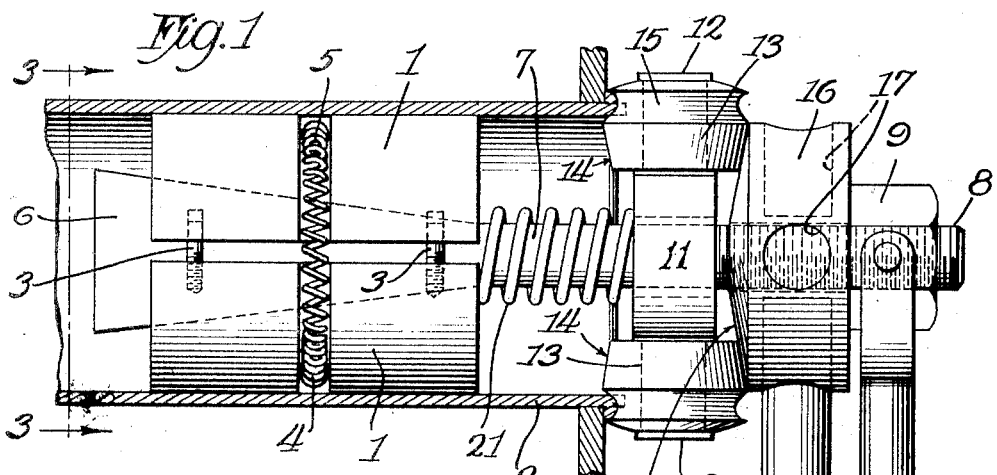
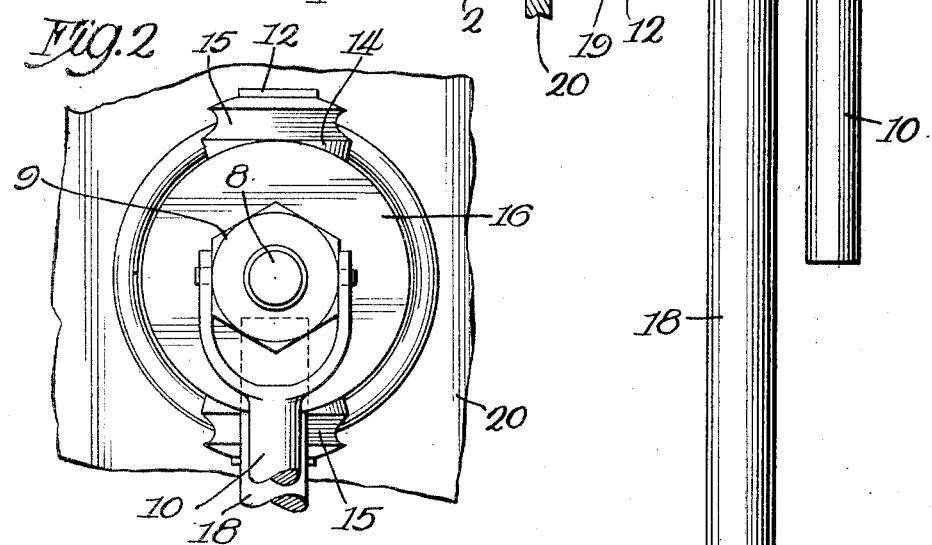
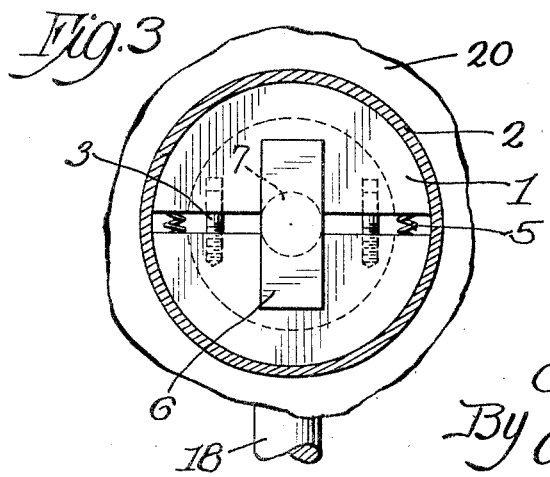
Inventor
Clyde Ambert Pippin
By Arthur F. Durand
Atty.

Patented Feb. 23, 1932

1,846,437

UNITED STATES PATENT OFFICE

CLYDE AMBERT PIPPIN, OF CHICAGO, ILLINOIS, ASSIGNOR TO THEOPHILOUS C. DUBE, OF CHICAGO, ILLINOIS

PIPE-SWAGING TOOL

Application filed November 28, 1930. Serial No. 498,552.

This invention relates to swaging or rolling devices for swaging or rolling over the edges of the end of a pipe or tube, such as a boiler tube, thereby to anchor the pipe or tube in a boiler head or other support.

Generally stated, the object of the invention is to provide a novel and improved construction whereby this swaging or rolling operation may be performed by means having a rotary motion about the longitudinal axis of the pipe or tube, thereby making it unnecessary to use a hammer or similar tool, as is ordinarily true of this kind of work as heretofore done in boiler factories and other shops where swaging or rolling of the edges of the ends of pipes is necessary or desirable.

It is also an object to provide certain details and features of construction and combinations tending to increase the general efficiency and the desirability of a pipe or tube swaging machine or device of this particular character.

To the foregoing and other useful ends, the invention consists in the matters hereinafter set forth and claimed, and shown in the accompanying drawings, in which,—

Fig. 1 is a side elevation of a pipe or tube swaging machine or device embodying the principles of the invention, showing the pipe or tube in longitudinal section;

Fig. 2 is an end elevation of the said machine or device; and

Fig. 3 is a vertical transverse section on line 3—3 in Fig. 1 of the drawings.

As thus illustrated, the invention comprises a pair of blocks 1, 1 that are curved in form to fit the interior of the pipe or tube 2, as shown. These blocks are held in proper relative position by the dowel pins 3, fastened in one of the blocks and engaging holes in the other block. In addition, the blocks are provided with a circumferential groove 4 in which an annular and helical spring 5 is disposed, tending to draw the blocks toward each other.

Between the blocks there is a tapered member in the form of a wedge 6, having a cylindrical stem 7 at its outer end. This stem is screw-threaded for a portion of its length, say, for about half of its length, as at 8, and is provided with a threaded nut 9 engaging said screw-threaded portion, which nut has a swiveled handle 10 for the rotation of the nut. On the unthreaded portion of the stem 7, there is a freely rotatable collar 11 having radial axles 12, on which are mounted the wheels 13, as shown. These wheels are provided with beveled portions 14, and with circumferential channels 15, the two wheels being diametrically opposed. A rotary collar 16 is mounted on the stem 7, to rotate freely thereon, between the nut 9 and the wheels 13, this collar having radial holes 17 for the insertion of the rod or handle 18 by which the collar is rotated. This collar 16 has a beveled face 19, as shown, which face engages the bevels 14 of the two wheels.

In operation, the machine or device is adjusted in position, as shown, with the channels 15 engaging the edges of the end of the tube. The nut 9 is then tightened to cause the wedge 6 to move the blocks 1 apart, thereby to anchor the inner end of the machine or device firmly in the tube, by the frictional engagement of said blocks with the inner surface of the tube. The handle 18 is then operated to rotate the collar 16, and the frictional engagement of this collar with the wheels 13 will cause the latter to rotate on their axles, at the same time causing the wheels to travel around the longitudinal axis of the tube or pipe, in engagement with the circular end edges of the tube or pipe, by the motion of the handle 18 about the axis of its rotation. In this way, and by now and then tightening the nut 9, the channels 15 of the wheels 13 will cause the desired swaging action, thereby causing the edges of the tube or pipe to be rolled over in the desired manner, thus in effect enlarging the end of the tube or pipe and anchoring it in the boiler head or other wall 20, in a manner that will be readily understood.

After the swaging operation is performed, the nut 9 is then loosened, permitting the wedge 6 to move inwardly, and permitting the spring 5 to draw the blocks 1 toward each other, thereby releasing the machine or device from its anchoring engagement with the inner surface of the tube or pipe.

It will be seen that the wheels 13 are equidistantly spaced, and that these wheels not only rotate about their axes, but also move bodily and circumferentially and axially of the tube or pipe, during the progress of the swaging operation. With this arrangement, the pressure of the rotary collar or member 16 on the wheels is balanced, whereby the swaging action is uniform along the edges of the pipe or tube.

If desired, the spring 21 can be interposed between the blocks 1 and the collar 11, in the manner shown, to crowd the blocks 1 back into position at certain times. Also, and while the opening 17 and the handle 18 are shown and described as a means of rotating the member 16, it will be understood that such rotation can be accomplished by any suitable or desirable means.

Furthermore, while the member 16 has frictional engagement with the wheels or rollers 13, it will be understood that this engagement can be of any suitable known or approved character, being in effect a bevel gear connection, of any suitable character, although a friction bevel gear is shown in the drawings.

What I claim as my invention is:

1. A machine for use in swaging or rolling over the end edges of a pipe or tube, comprising tube engaging and swaging means, and instrumentalities for rotating said swaging means about the longitudinal axis of the pipe or tube, by peripheral engagement with said swaging means, and for at the same time causing said swaging means to move axially of the pipe or tube during the progress of the swaging operation.

2. A structure as specified in claim 1, said swaging means comprising one or more wheels peripherally formed to engage and swage the edges of the tube in the desired manner.

3. A structure as specified in claim 1, said swaging means comprising a plurality of equidistant wheels peripherally formed to engage and swage the edges of the tube or pipe, with means to support said wheels, and including a rotary member engaging the peripheries of said wheels, whereby the rotation of said member causes rotation of said wheels, thereby causing said wheels to roll around on the circular edges of the tube or pipe.

4. A structure as specified in claim 1, said swaging means comprising a plurality of equidistant wheels peripherally formed to engage and swage the edges of the tube or pipe with means to support said wheels and including a rotary member engaging the peripheries of said wheels, whereby the rotation of said member causes rotation of said wheels, thereby causing said wheels to roll around on the circular edges of the tube or pipe, together with tightening means for crowding said member tightly against said wheels, causing said wheels to move longitudinally of the tube as the edges of the latter are rolled over.

5. A structure as specified in claim 1, said instrumentalities comprising expansible anchoring means for engagement with the inner surface of the tube or pipe, thereby to resist the pressure of the swaging means on the edges of the tube or pipe.

6. A structure as specified in claim 1, said instrumentalities comprising expansible anchoring means for engagement with the inner surface of the tube or pipe, thereby to resist the pressure of the swaging means on the edges of the tube or pipe, said anchoring means comprising a plurality of blocks movable toward and away from each other, and adapted to engage the inner surface of the tube or pipe, and including a tapered member inserted between said blocks, together with screw-threaded means for drawing said tapered member forward to push the blocks into effective anchoring engagement with the inner surface of the tube or pipe.

7. A structure as specified in claim 1, said instrumentalities comprising expansible anchoring means for engagement with the inner surface of the tube or pipe, thereby to resist the pressure of the swaging means on the edges of the tube or pipe, said anchoring means comprising a plurality of blocks movable toward and away from each other, and adapted to engage the inner surface of the tube or pipe, and including a tapered member inserted between said blocks, together with screw-threaded means for drawing said tapered member forward to push the blocks into effective anchoring engagement with the inner surface of the tube or pipe, and resilient means encircling said block and tending to draw them toward each other.

8. A structure as specified in claim 1, said swaging means comprising a plurality of wheels, each wheel having a beveled peripheral portion and a channeled peripheral portion, said instrumentalities also including a rotary member having a beveled face for engaging the beveled periphery of each wheel, and means for rotating said beveled member.

9. A structure as specified in claim 1, said swaging means comprising a plurality of wheels, each wheel having a beveled peripheral portion and a channeled peripheral portion, said instrumentalities also including a rotary member having a beveled face for engaging the beveled periphery of each wheel, and means for rotating said beveled member, together with screw-threaded means for crowding said beveled member and wheels forward into effective swaging engagement with the edges of the pipe or tube.

Specification signed this 19th day of November, 1930.

CLYDE AMBERT PIPPIN.